No. 743,383. PATENTED NOV. 3, 1903.
G. D. HARRIS.
EVAPORATING APPARATUS.
APPLICATION FILED AUG. 20, 1902.
NO MODEL. 2 SHEETS—SHEET 2.
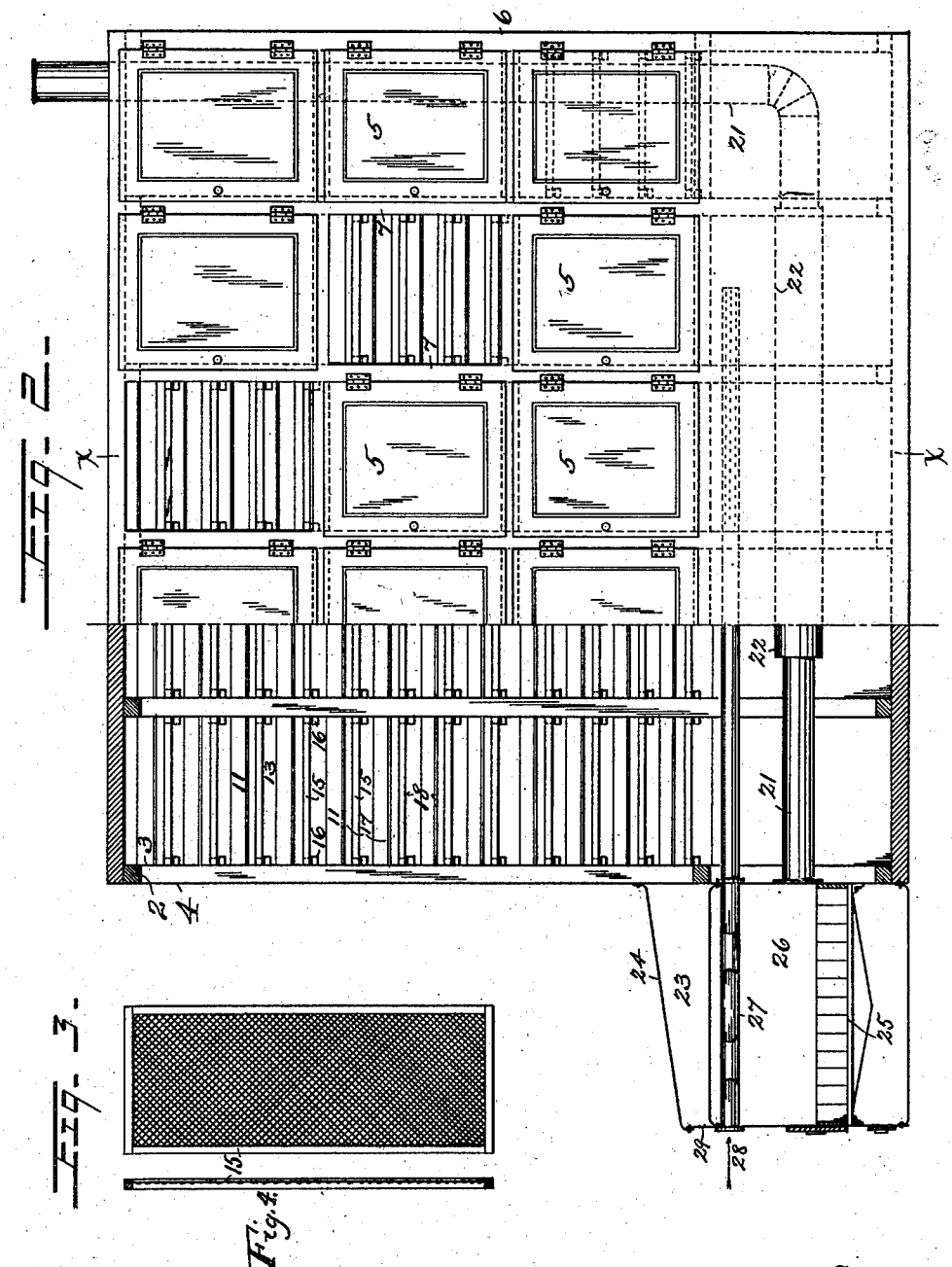
Witnesses
David Levan
D. M. Stewart
Inventor
Gordon Don Harris
by 
Attorney.

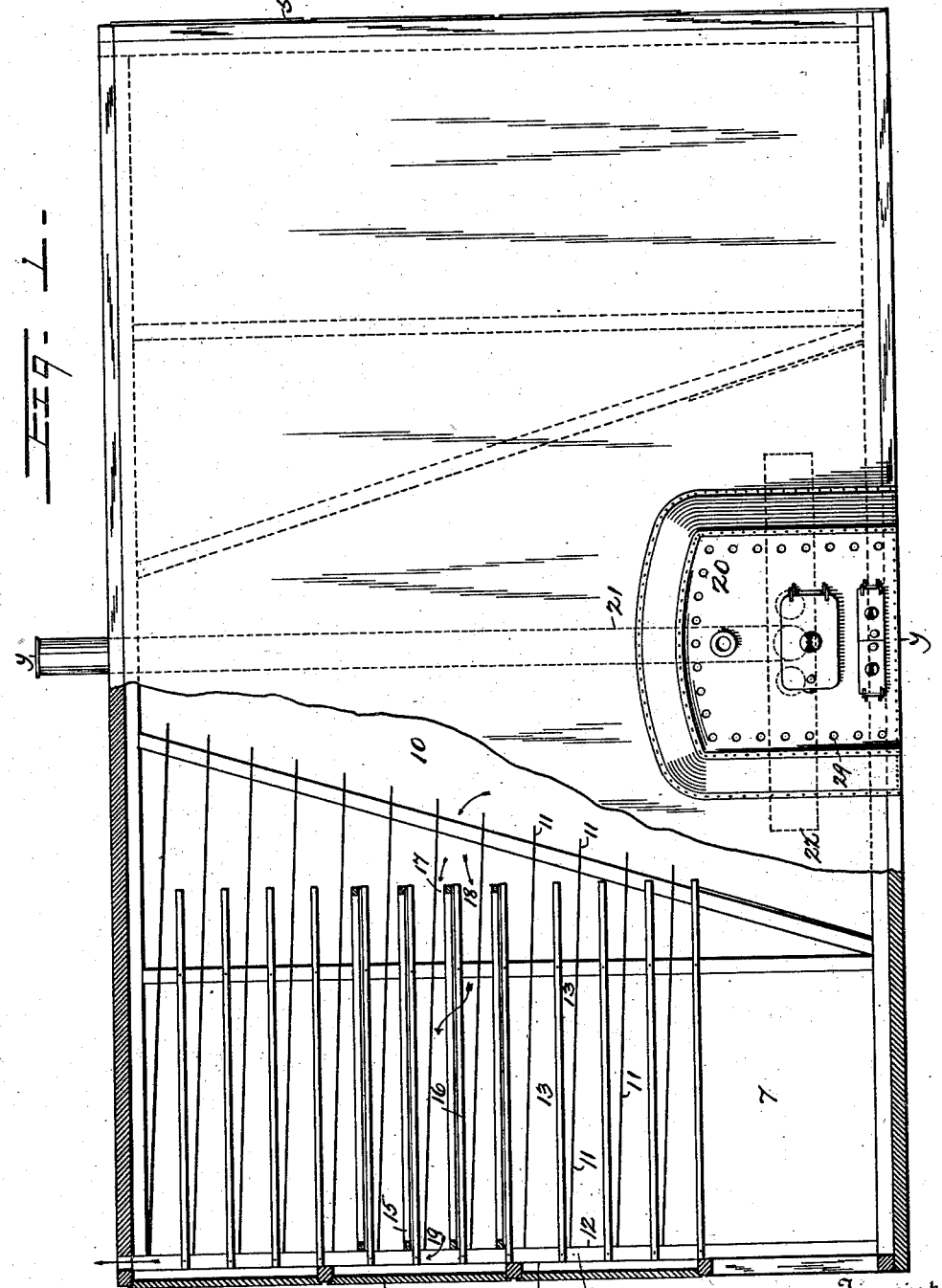

No. 743,383. Patented November 3, 1903.

UNITED STATES PATENT OFFICE.

GORDON DON HARRIS, OF NEW YORK, N. Y., ASSIGNOR TO J. H. PENNINGTON, OF NEW YORK, N. Y.

EVAPORATING APPARATUS.

SPECIFICATION forming part of Letters Patent No. 743,383, dated November 3, 1903.

Application filed August 20, 1902. Serial No. 120,318. (No model.)

*To all whom it may concern:*

Be it known that I, GORDON DON HARRIS, a citizen of the United States of America, and a resident of the city and county of New York, State of New York, have invented certain new and useful Improvements in Evaporating Apparatus, of which the following is a specification.

My invention relates to an improved evaporating apparatus, adapted more particularly for the treatment of bananas preparatory to converting the same into various food products, though applicable also to other similar uses.

The main object of my invention is to effect the thorough drying of the fruit without subjecting the same to any cooking or other injurious action and with the greatest facility and economy. To accomplish this, I not only provide for an independent circulation of the drying medium in contact with each separate layer or tray of the fruit being treated, but I also provide for the more effective and satisfactory utilization of the air-current by causing a portion thereof to circulate through the layers of fruit, to quickly free the moisture therein, and another portion to promptly carry off the moisture so freed from the fruit, thus maintaining at all stages in the process a very low humidity within the apparatus, which condition is essential to the securing of the best results, as well as to the proper maintenance of the apparatus.

My invention consists in the means provided for securing these effects and in other novel features of the apparatus shown in the accompanying drawings, all of which are fully described in connection therewith and are particularly pointed out in the claims.

Figure 1 is a front elevation, partly in cross-section on the line $x$ $x$ of Fig. 2, of a preferred form of apparatus embodying my improvements, some of the compartments being shown with the trays in position therein, others without trays. Fig. 2 is a side elevation, partly in section on the line $y$ $y$ of Fig. 1, some of the tray-compartments being shown with doors and others with the doors removed. Figs. 3 and 4 show a tray separately in two different views.

The casing of the apparatus as shown is a rectangular box formed with hollow non-conducting walls the wooden framework 2 of which is provided with interior and exterior plates 3 and 4 of galvanized sheet metal. The side walls, however, are each formed by several vertical series of doors 5 separately hinged to the outer edges of the rear wall 6 and of parallel vertical partitions 7, which outer edges are on the vertical line 8, Fig. 1, while the inner edges of the partitions 7 extend to the inclined line 9. Between these inclined inner edges 9 of the inwardly-extending partitions 7 from each side of the casing is formed the intermediate hot-air chamber 10, hereinafter referred to. The spaces between the vertical partitions 7 are each divided into an upright series of tray-compartments by means of approximately-horizontal partition-plates 11 11, each extending from a point on the vertical line 12 somewhat in from the edge 8 of the vertical partitions 7 inward to the hot-air chamber 10. These partition-plates form the top and bottom walls of superposed tray-compartments 13, and the inner edge of each extends beyond or overhangs the one below it, thereby insuring the equal distribution of hot air withdrawn from the chamber 10 through the several compartments 13 of each series. The outer ends of these compartments 13 communicate with a common exhaust-flue 14, formed between the outer extremities of the top and bottom plates 11 and the inner faces of the hinged doors 5, which latter jointly form the side walls of the casing, as stated, when closed, while permitting the insertion and withdrawal of the fruit-holding trays into and from the compartments. These trays 15, as shown, are merely rectangular frames with wire-netting or other perforated bottoms, upon which to rest the fruit. They are slid into the compartments 13 upon horizontally-supporting strips 16, fixed to the side walls thereof, and are located about midway between the top and bottom walls of the compartment, leaving passage-room both above and below the tray in each compartment for the hot air from chamber 10. The partition-plates 11 11, which form these top and bottom walls, are preferably somewhat inclined relative to the horizontally-arranged trays, as shown, thus dividing the stream of hot air from the chamber 10 into an upper current entering the space above the tray at 17 and a lower current of greater volume, which passes below the tray at 18. As the latter moves outward it is diverted upward through the perforated tray-bottom and the fruit thereon, and after being laden with water freed from the latter joins the dry upper current in its passage to the exhaust-exit 14 through the enlarged outlet 19 provided above the outer end of the tray by the inclined arrangement of the partition-plate 11. By this means the accumulation of moisture upon the walls of the compartments from the humidity-laden air that has passed through the loaded trays is effectually prevented, and the atmosphere within the evaporator is at all times dry and wholesome and the resulting product of correspondingly superior quality.

In order to most effectively utilize the space within the hot-air chamber 10, I provide a heating mechanism in connection therewith, as shown. This mechanism comprises an air-heating furnace 20, located at the front end of said chamber, by means of which heated air is supplied to the latter, and a furnace-flue 21, with intermediate drum 22 extending rearwardly through the lower portion thereof and serving to utilize the heat remaining in the escaping products of combustion in maintaining a proper temperature within the chamber. The furnace 20 is preferably located in front of the evaporator-casing, with which latter an air-chamber 23, formed around the furnace by the furnace-casing 24, is in communication.

25 represents the grate of the furnace, 26 the fire-chamber thereof, and 27 an air-conducting pipe passing through the latter in a coiled or serpentine course, so as to present considerable heating-surface therein. Cold air is admitted to this pipe or air-conduit at 28 and is discharged into the hot-air chamber 10 of the evaporator through a horizontal extension in the latter, perforated so as to properly distribute the inflowing air. The additional supply of air furnished through the communicating air-chamber 23, inclosing the furnace, enters the latter cold through openings 29 in the casing-wall and is sufficiently heated by the furnace before passing into the evaporator air-chamber. The furnace-flue 21, with its intermediate drum 22, being located within the chamber 10, as previously described, assists in maintaining the required temperature of air in the latter by utilizing heat which would otherwise be wasted.

What I claim is—

1. An evaporating apparatus comprising a hot-air chamber, superposed compartments communicating therewith and forming independent hot-air passage-ways therefrom, and perforated trays located in said compartments between the top and bottom walls thereof and serving to divide each inflowing stream of air into currents passing respectively through and over the perforated tray, said top and bottom walls being inclined relative to the inclosed tray and the top wall of each compartment overhanging the bottom wall within the hot-air chamber, substantially as set forth.

2. An evaporating apparatus comprising a hot-air chamber, superposed tray-compartments serving as hot-air passage-ways therefrom and formed by fixed parallel partitions successively overhanging each other in said chamber, and perforated trays supported intermediately in said compartments substantially as set forth.

3. An evaporating apparatus comprising a hot-air chamber, two or more vertical series of tray-compartments communicating therewith and serving as hot-air passage-ways therefrom, a common exit or exhaust flue communicating with the opposite ends of said compartments, and separate tray-admission doors for corresponding groups of compartments, having their inner faces adapted when closed, to form jointly a wall of said exit-flue at a suitable distance from the air-exit ends of said compartments substantially as set forth.

4. An evaporating apparatus comprising an intermediately-located hot-air chamber, opposite series of superposed tray-compartments communicating at their adjacent inner ends with said intermediate chamber and extending laterally therefrom in opposite directions, an air-heating furnace located at one end of said chamber and provided with cold-air inlets thereto and heated-air outlets therefrom into said chamber, and a furnace-flue extending through said chamber and forming a heating-drum therein, substantially as set forth.

5. An evaporating apparatus comprising a hot-air chamber, a compartment communicating at one of its ends with the air-chamber and at its other with an exhaust, a fruit-support in said compartment and arranged to divide the hot air flowing therethrough into a lower evaporating-current and an upper draft-current the evaporating-current passing through the fruit-support and the draft-current passing over said support and along the walls of the compartment above the said support and raising the temperature of the evaporating-current as it leaves the fruit, thereby preventing the precipitation on the walls of the compartment above the fruit-support of moisture carried upward by the evaporating-current, and facilitating the movement of air through the compartment.

Signed at 309 Broadway, New York city, New York, this 13th day of August, 1902.

GORDON DON HARRIS.

Witnesses:
JACOB RIFFET,
ELI SMITH.